United States Patent
Salvador et al.

(10) Patent No.: US 9,264,966 B2
(45) Date of Patent: Feb. 16, 2016

(54) METHOD AND APPARATUS FOR LTE HANDOVER REDUCTION

(71) Applicant: Alcatel-Lucent, Paris (FR)

(72) Inventors: Omar Salvador, Wheaton, IL (US); Jean-Michel P. Pugeat, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 115 days.

(21) Appl. No.: 13/792,761

(22) Filed: Mar. 11, 2013

(65) Prior Publication Data

US 2014/0254550 A1 Sep. 11, 2014

(51) Int. Cl.
*H04W 4/00* (2009.01)
*H04W 36/24* (2009.01)

(52) U.S. Cl.
CPC .................................. *H04W 36/245* (2013.01)

(58) Field of Classification Search
CPC .............................. H04W 36/00; H04W 36/24
See application file for complete search history.

(56) References Cited

U.S. PATENT DOCUMENTS

| | | | | |
|---|---|---|---|---|
| 2002/0132628 A1* | 9/2002 | Matsumoto | ............ | H04W 36/32 455/456.1 |
| 2010/0284272 A1* | 11/2010 | Wang | ..................... | H04W 28/24 370/230 |
| 2011/0014937 A1* | 1/2011 | Takata | ............... | H04W 36/0055 455/509 |
| 2011/0223914 A1 | 9/2011 | Hashimoto | | |
| 2012/0039305 A1* | 2/2012 | Han | ..................... | H04W 36/245 370/332 |
| 2012/0122456 A1* | 5/2012 | Gao | ..................... | H04W 36/245 455/436 |
| 2012/0172028 A1* | 7/2012 | Korus et al. | ................. | 455/422.1 |

FOREIGN PATENT DOCUMENTS

| | | | | | |
|---|---|---|---|---|---|
| CN | WO 2013113181 A1 | * | 8/2013 | ............ | H04W 4/027 |
| DE | WO2013050082 A1 | * | 7/2011 | ............ | H04W 36/00 |
| DE | WO 2013050082 A1 | * | 4/2013 | ........ | H04W 36/0094 |
| FR | 2973638 A1 | | 10/2012 | | |
| JP | EP2661126 A1 | * | 7/2011 | ............ | H04W 36/38 |
| JP | WO2012111844 A1 | * | 2/2012 | ............ | H04W 36/00 |
| JP | EP 2661126 A1 | * | 11/2013 | ............ | H04W 36/30 |
| SE | WO2012050493 A1 | * | 10/2010 | ............ | H04W 36/36 |
| SE | WO 2012050493 A1 | * | 4/2012 | ............ | H04W 48/17 |
| WO | WO-2012/139514 A1 | | 10/2012 | | |
| WO | WO 2013113181 A1 | * | 8/2013 | ............ | H04W 28/06 |

OTHER PUBLICATIONS

International Search Report for International Application No. PCT/US2014/019799 mailed Jul. 2, 2014.
International Search Report and Written Opinion for International Application No. PCT/US2014/019799 mailed Aug. 22, 2014.
"3GPP TS 36.331 V9.3.0 (Jun. 2010): Technical Specification". 3rd Generation Partnership Project; 3GPP Organizational Partners; Valbonne, France 2010.
"ETSI TS 136 413 V8.6.1 (Jul. 2009): Technical Specification". LTE; European Telecommunications Standards Institute; Sophia Antipolis Cedex, France 2009.

* cited by examiner

*Primary Examiner* — Yemane Mesfin
*Assistant Examiner* — Abdelillah Elmejjarmi
(74) *Attorney, Agent, or Firm* — Harness, Dickey & Pierce, P.L.C.

(57) ABSTRACT

A method of setting hand over (HO) parameters for a user equipment (UE) connected to a first cell of a base station (BS) may include receiving, at the BS, history data corresponding to the UE, the history data including, for each of a plurality of cells the UE was previously connected to, an entry including HO information of the UE at the cell; determining at the BS, an activity type of the UE based on the received history data; and setting, at the BS, the HO parameters for the UE based on the determined activity type, the HO parameters controlling the manner in which the UE detects conditions for initiating an HO event.

10 Claims, 5 Drawing Sheets

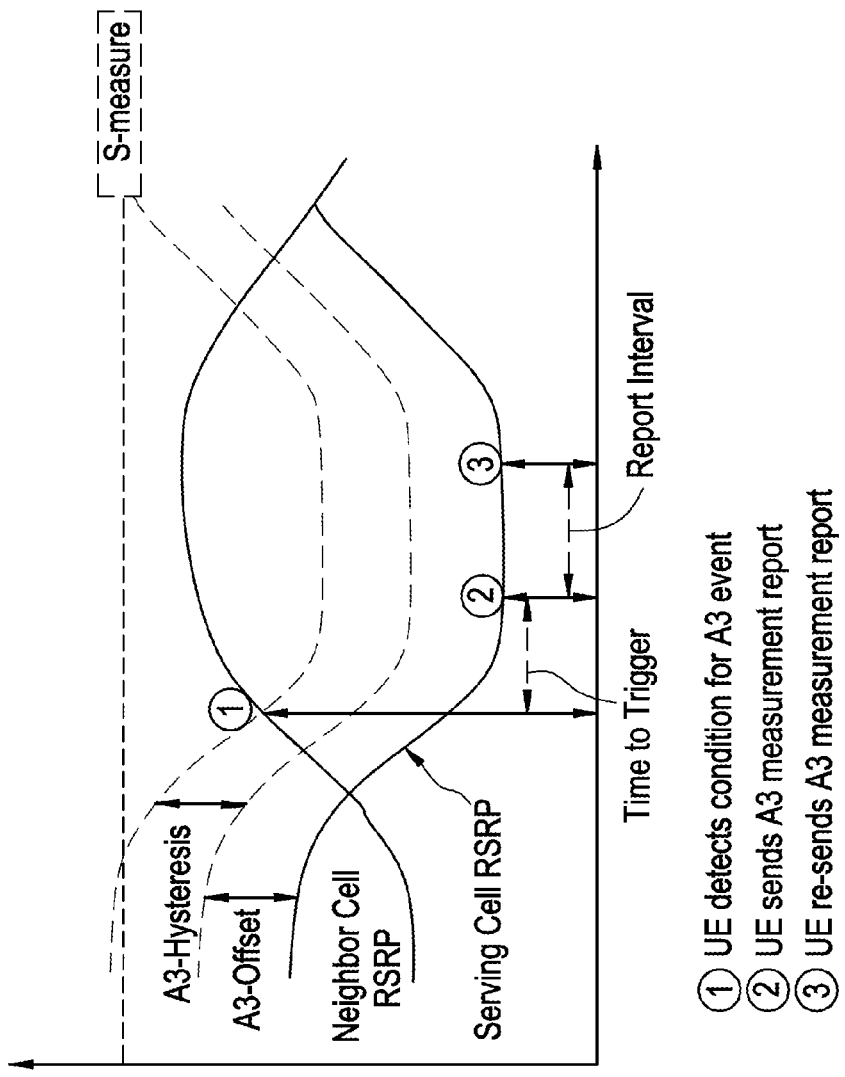

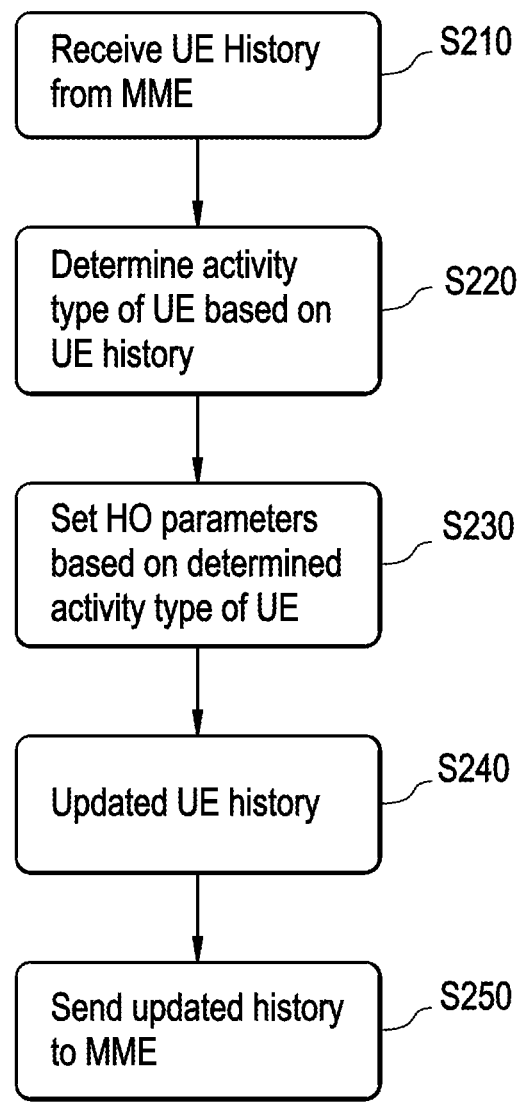

METHOD AND APPARATUS FOR LTE HANDOVER REDUCTION

BACKGROUND OF THE INVENTION

1. Field

Example embodiments relate generally to handling handovers in long term evolution (LTE) networks.

2. Related Art

The LTE Hand-Over (HO) events that are triggered by User Equipments UEs, are very sensitive to HO parameter thresholds which are used to determine if a HO event needs to be triggered. HO parameter thresholds are specified in 3GPP TS 36.331, which is incorporated herein in its entirety, and include, for example, the hysteresis and A3Offset parameters. These parameters are configured per cell or enhanced NodeB (eNB) and are provided to all the UEs served by the cell or eNB.

Different UEs may have different service level agreements (SLAs), and the key performance indicators (KPIs) associated with each SLA may differ. The particular HO parameter thresholds selected for a cell or eNB may affect the ability of a UE connected to that cell or eNB to maintain KPIs which are acceptable with respect to the SLA of the UE.

SUMMARY OF THE INVENTION

According to at least one example embodiment, a method of setting hand over (HO) parameters for a user equipment (UE) connected to a first cell of a base station (BS) includes receiving, at the BS, history data corresponding to the UE, the history data including, for one or more cells the UE was previously connected to, at least one entry including HO information of the UE at a respective one of the one or more cells; determining at the BS, an activity type of the UE based on the history data; and setting, at the BS, the HO parameters for the UE based on the activity type, the HO parameters controlling the manner in which the UE detects conditions for initiating an HO event.

According to at least one example embodiment, the HO parameters include at least one of a hysteresis value, an offset value and a time to trigger (TTT) value.

According to at least one example embodiment, the BS is an enhanced node B (eNB), and the method further includes determining, at the eNB, to perform an HO operation for switching the UE from being connected to the first cell of the BS to a second cell; updating, at the eNB, the history data of the UE by including information regarding the HO operation in the history data; and sending the history data from the eNB to a mobility management entity (MME) associated with the eNB.

According to at least one example embodiment, the HO parameters set at the BS include inter-radio access technology (RAT) HO parameters controlling the manner in which the UE detects conditions for initiating an inter-RAT HO event between cells having different RAT types, and intra-RAT HO parameters controlling the manner in which the UE detects conditions for initiating an intra-RAT HO event between cells having a same RAT type.

According to at least one example embodiment, the setting, at the BS, the HO parameters for the UE includes setting the HO parameters based on the activity type and an active service type of the UE, the active service type being one of guaranteed bit rate and best effort.

According to at least one example embodiment, a method of facilitating the setting of hand over (HO) parameters for user equipment (UE) include receiving, at a management element, a request to connect the UE to a base station (BS); identifying history data corresponding to the UE, the history data being stored at the management element; and sending, from the management element, the history data to the BS, in response to the request, the history data including, for one or more cells the UE was previously connected to, an entry including HO information of the UE at the cell.

According to at least one example embodiment, the method may further include receiving, at the management element, a request from the BS to release the connection of the UE to the BS, the request including update information corresponding to the UE, the update information indicating HO one or more events which occurred while the UE was connected to the BS; and updating the history data stored at the management element based on the update information.

According to at least one example embodiment the management element is a mobility management entity (MME) and the BS is an enhanced node B (eNB).

According to at least one example embodiment, a base station (BS) may include a processor configured to execute operations for setting hand over (HO) parameters for a user equipment (UE) connected to a first cell of the BS, the operations including, receiving, at the BS, history data corresponding to the UE, the history data including, for one or more cells the UE was previously connected to, an entry including HO information of the UE at a respective one of the one or more cells; determining at the BS, an activity type of the UE based on the history data; and setting, at the BS, the HO parameters for the UE based on the activity type, the HO parameters controlling the manner in which the UE detects conditions for initiating an HO event.

According to at least one example embodiment, the HO parameters include at least one of a hysteresis value, an offset value and a time to trigger (TFT) value.

According to at least one example embodiment, the BS is an enhanced node B (eNB), and the processor is configured such that operations further include, determining, at the eNB, to perform an HO operation for switching the UE from being connected to the first cell of the BS to a second cell; updating, at the eNB, the history data of the UE by including information regarding the HO operation in the history data; and sending the history data from the eNB to a mobility management entity (MME) associated with the eNB.

According to at least one example embodiment, the processor is configured such that the HO parameters set at the BS include inter-radio access technology (RAT) HO parameters controlling the manner in which the UE detects conditions for initiating an inter-RAT HO event between cells having different RAT types, and intra-RAT HO parameters controlling the manner in which the UE detects conditions for initiating an intra-RAT HO event between cells having a same RAT type.

According to at least one example embodiment the processor is configured such that, the setting, at the BS, the HO parameters for the UE includes setting the HO parameters based on the activity type and an active service type of the UE, the active service type being one of guaranteed bit rate and best effort.

According to at least one example embodiment, a management element may include a processor configured to execute operations for facilitating the setting of hand over (HO) parameters for a user equipment (UE), the operations including, receiving, at the management element, a request to connect the UE to a base station (BS); identifying history data corresponding to the UE, the history data being stored at the management element; and sending, from the management element, the history data, in response to the request, the history data including, for one or more cells the UE was previously connected to, an entry including HO information of the UE a respective one of the one or more cells.

According to at least one example embodiment, the processor is configured such that the operations further include, receiving, at the management element, a request from the BS to release the connection of the UE to the BS, the request including update information corresponding to the UE, the update information indicating HO events which occurred while the UE was connected to the BS; and updating the history data stored at the management element based on the update information.

According to at least one example embodiment, the management element is a mobility management entity (MME) and the BS is an enhanced node B (eNB).

BRIEF DESCRIPTION OF THE DRAWINGS

Example embodiments will become more fully understood from the detailed description provided below and the accompanying drawings, wherein like elements are represented by like reference numerals, which are given by way of illustration only and thus are not limiting and wherein:

FIG. 1B is a diagram for explaining different HO parameter thresholds associated with an A3 event.

FIG. 2 is a flow chart illustrating a method for updating HO parameters according to at least one example embodiment.

DETAILED DESCRIPTION OF EXAMPLE EMBODIMENTS

Figure 1A:
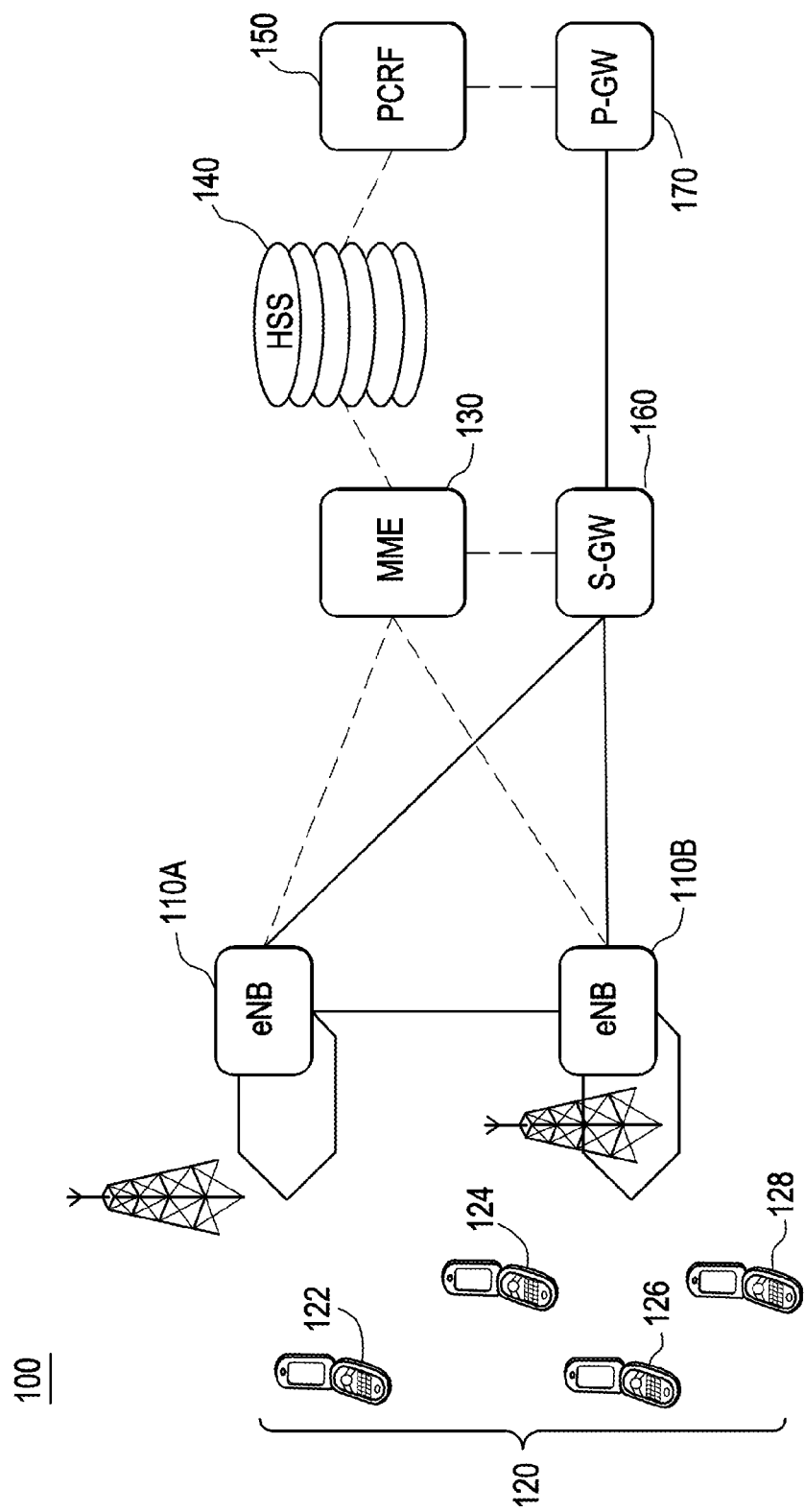
FIG. 1A illustrates a portion of a wireless communications network.

At least one example embodiment will now be described more fully with reference to the accompanying drawings in which some example embodiments are shown.

Detailed illustrative embodiments are disclosed herein. However, specific structural and functional details disclosed herein are merely representative for purposes of describing at least one example embodiment. Example embodiments may, however, be embodied in many alternate forms and should not be construed as limited to only the embodiments set forth herein.

Accordingly, while example embodiments are capable of various adaptations and alternative forms, embodiments thereof are shown by way of example in the drawings and will herein be described in detail. It should be understood, however, that there is no intent to limit example embodiments to the particular forms disclosed, but on the contrary, example embodiments are to cover all adaptations, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile unit, mobile station, mobile user, access terminal (AT), subscriber, user, remote station, receiver, etc., and may describe a remote user of wireless resources in a wireless communication network. The term extended eNode B (eNB) may be considered synonymous to and/or referred to as a base transceiver station (BTS), NodeB, base station (BS), access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an eNB or MME shown in FIG. 1). Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Network Architecture

FIG. 1A illustrates a portion of a wireless communications network 100. Wireless communications network 100 may follow, for example, an LTE protocol. Wireless communications network 100 includes a mobility management entity (MME) 130, a first evolved node B (eNB) 110A, a second eNB 110B, a plurality of user equipments (UEs) 120 including first UE 122, second UE 124, third UE 126 and fourth UE 128, a home subscriber server (HSS) 140, a policy and charging rules function node (PCRF) 150, a serving gateway (S-GW) 160, and a public data network (PDN) gateway (P-GW) 170.

The UEs 120 may be in wireless communication with either of the first eNB 110A and the second eNB 110B. The first eNB 110A and the second eNB 110B are connected to the MME 130. Though not pictured, wireless communications network 100 may include other elements of an LTE core network in addition to MME 130. The UEs 120 may be, for example, mobile phones, smart phones, computers, or personal digital assistants (PDAs).

The first eNB 110A and the second eNB 110B may also be connected to the serving gateway 160. The S-GW 160 is capable of routing and forwarding user data packets of UEs connected to the first eNB 110A or the second eNB 110B. The S-GW 160 provides access for the first eNB 110A and the second eNB 110B to the P-GW 170. The P-GW 170 provides the first eNB 110A and the second eNB 110B with access to other packet data networks including, for example the internet. For the purpose of simplicity, the operations of the first eNB 110A and the second eNB 110B will be discussed primarily with reference to the first eNB 110A. However, the second eNB 110B is capable of operating in the same manner discussed with reference to the first eNB 110A.

Explanation of Handoff (HO) Thresholds

As is described above, the LTE Hand-Over (HO) events that are triggered by UEs are very sensitive to HO parameter thresholds, which are configured for each cell or eNB. HO parameter thresholds include, for example, A3 hysteresis, A3 offset and time to trigger (TTT) parameters. FIG. 1B is a diagram for explaining different HO parameter thresholds associated with an A3 event. FIG. 1B illustrates the reference signal received power (RSRP) for a neighboring cell, the RSRP for a serving cell, and associated A3 Hysteresis and A3 Offset values, as measured by a UE over time. FIG. 1B also illustrates two time periods: a TTT, and a report interval. As used herein, a serving cell is a cell a UE is currently connected to while a neighboring cell is a different cell the UE is not currently connected to. Both the serving cell and the neighboring cell may have a coverage area that includes the current location of the UE.

In general, the UE detects the conditions for an A3 event, as is indicated by point 1 illustrated in FIG. 1B, once the UE determines that the difference [(RSRP of the neighboring cell)−(RSRP of the serving cell)] exceeds the sum [((A3 hysteresis)+(A3 offset)]. Further, handover decisions may also be based on quality criterion including, for example, reference signal received quality (RSRQ). If the detected condition still exists after a period of time equal to the TTT parameter, as is indicated by point 2 illustrated in FIG. 1B, the UE sends an A3 measurement report, as is indicated by point 2 in FIG. 1B. For example, the UE may send the A3 measurement report to the eNB of the serving cell. The eNB may respond to the A3 measurement report by determining whether or not to initiate an HO operation according to known methods. If the UE does not receive a response from the eNB after sending the A3 measurement report, the UE may send another A3 measurement report after the report interval has elapsed, as indicated by point 3 in FIG. 1B. So long as the condition detected at point 1 persists and the UE dos not receive a response from the eNB, the UE may continue to send A3 measurement reports at an interval of time equal to the report interval.

Based on observations from current LTE field deployments, when the HyOf threshold, a combined total of the A3 hysteresis and A3 offset, was increased from 2 dB to 6 dB, the average HO rate was reduced by a factor of about 4 to 5. However, in general, one configuration for HO parameter thresholds, for example A3 hysteresis, A3 offset, and TTT parameters, may not be optimal for all UEs connected to a given cell or eNB, and may not be able to support the key performance indicators (KPIs) associated with service level agreements (SLAs) of all UEs, especially when UEs have active real time sessions or when UEs have medium or high speed mobility.

For example, a higher HyOf threshold, for example 6 dB, may be acceptable for UEs that have low mobility and support only best effort applications, and thus, can tolerate relatively longer delays. However, for UEs with real time applications or services, or UEs having higher mobility, for example UEs moving at high speed like that of a moving car or train, a higher HyOf threshold may prevent the UEs from meeting some KPI targets. A higher HyOf threshold may also trigger an increase in failure scenarios including radio link failure (RLF) and HO failure, impact voice quality of a voice bearer. Accordingly, a higher HyOf threshold may result in a degraded UE experience for at least some UEs.

A lower HyOf threshold, for example 2 dB, may result in much higher HO rates, which may lead to ping-pong scenarios. Higher HO rates may cause an increase in a signaling load in the network, and a decrease in UE battery life. Accordingly, a lower HyOf threshold may result in a degraded UE experience for at least some UEs.

Accordingly, it would be desirable to have a process for updating HO parameters in order to minimize intra-RAT and inter radio access technology (IRAT) HO rates, and to facilitate the ability of UEs to meet KPI targets. A process for updating HO parameters will now be discussed in greater detail below. Though, for the purpose of simplicity, the discussion herein focuses on A3 measurement reports and related parameters, example embodiments are applicable to all measurement reports as specified in the 3GPP specs including, for example A1-A6 and B1-B2 measurement reports.

Overview of Method for Updating HO Parameters

Figure 1C:
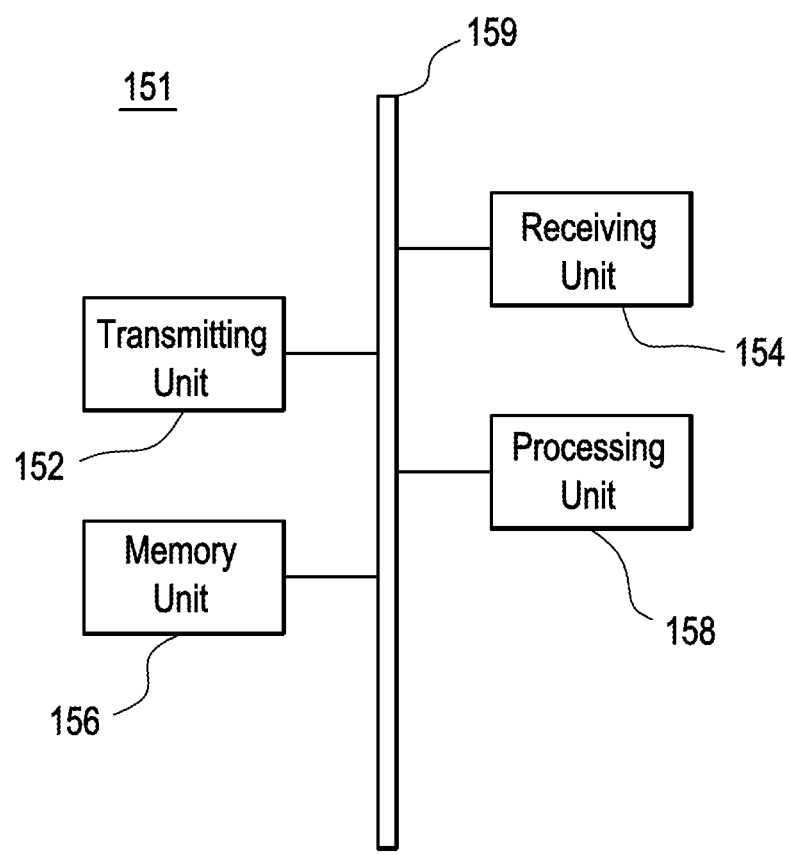
FIG. 1C is a diagram illustrating an example structure of a network element 151 according to at least one example embodiment.

FIG. 1C is a diagram illustrating an example structure of a network element 151 according to at least one example embodiment. According to at least one example embodiment, any of the eNBs or MMEs, including for example the first and second eNBs 110A and 110B, and the MME 130, may have the structure and operation of the network element 151 described below. Referring to FIG. 1C, the network element 151 may include, for example, a data bus 159, a transmitting unit 152, a receiving unit 154, a memory unit 156, and a processing unit 158.

The transmitting unit 152, receiving unit 154, memory unit 156, and processing unit 158 may send data to and/or receive data from one another using the data bus 159. The transmitting unit 152 is a device that includes hardware and any necessary software for transmitting wired and/or wireless signals including, for example, data signals, control signals, and signal quality information via one or more wired or wireless connections to other network elements in the wireless communications network 100.

The receiving unit 154 is device that includes hardware and any necessary software for receiving wireless and/or wired signals including, for example, data signals, control signals, and signal quality information via one or more wired or wireless connections to other network elements in communications network 100.

The memory unit 156 may be any device capable of storing data including magnetic storage, flash storage, etc.

The processing unit 158 may be any device capable of processing data including, for example, a microprocessor configured to carry out specific operations based on input data, and/or capable of executing instructions included in computer readable code.

Example methods for operating the network element 151, the first and second eNBs 110A and 110B, and the MME 130 will now be discussed in greater detail below with reference to FIGS. 2 and 3.

Figure 3:
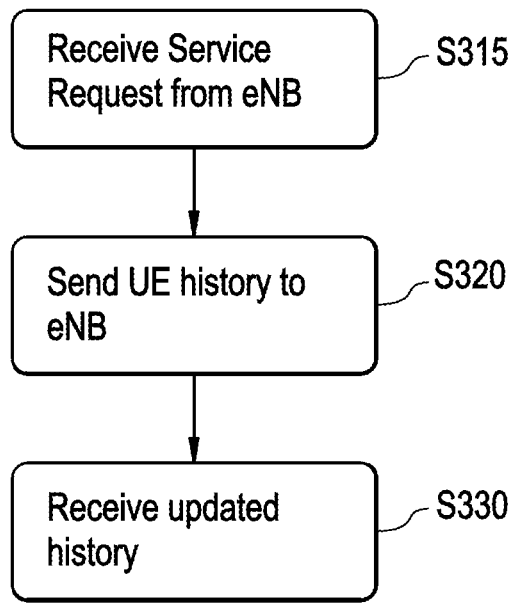
FIG. 3 is a flow chart illustrating a process for providing UE history information in order to facilitate updating of HO parameters according to at least one example embodiment

According to at least one example embodiment, each of the operations illustrated in, or described with respect to, FIGS. 2 and 3 as being performed by an eNB may be performed by, for example, an eNB having the structure of the network element 151 as illustrated in FIG. 1C. Likewise, each of the operations illustrated in, or described with respect to FIGS. 2 and 3 as being performed by an MME may be performed by, for example, an MME having the structure of the network element 151 as illustrated in FIG. 1C. For example, the memory unit 156 may store executable instructions corresponding to each of the operations described below with reference to FIGS. 2 and 3. Further, the processor unit 158 may be configured perform each of the operations described below with respect to FIGS. 2 and 3, for example, by executing instructions stored in the memory unit 156. Further, according to at least one example embodiment, with respect to data or control signals described with reference to any of FIGS. 2 and 3 as being transmitted or received, transmitted data and/or control signals may be transmitted through the transmitting unit 152, and received data and/or control signals may be received through the receiving unit 154.

FIG. 2 is a flow chart illustrating a method for updating HO parameters according to at least one example embodiment. FIG. 2 will be described with reference to the communications network 100 of FIG. 1A from the perspective of the first eNB 110A. However, the operations described below with respect to the first eNB 110A may be performed by any eNB in the communications network 100 including, for example the second eNB 110B.

Referring to FIG. 2, in step S210, the first eNB 110A receive a UE history from the MME 130. For example, once the first UE 122 enters a coverage area of the first eNB 110A and sends a request to connect to the first eNB 110A, the request may be received at the first eNB 110A and forwarded by the first eNB 110A to the MME 130 in accordance with known procedures. In response to the request forwarded to the MME 130 by the first eNB 110A, the MME 130 may send a UE history of the first UE 122 to the eNB 110A. For example, the first MME 130 may send the UE history to the eNB 110A in an initial context setup request message to the eNB 110A. For example, the initial context setup request message received by the eNB 110A may be that which is defined in the 3GPP specification TS 23.401.

According to example embodiments, the MME 130 stores UE histories corresponding to UEs within the communications network 100. Each UE history may include intra-RAT information and IRAT information.

With respect to the intra-RAT information, the intra-RAT information may include information regarding the last N cells the UE has been connected to, where N may be any positive integer. For example, N may be set in accordance with the preference of a network operator. For example, the UE history may include information regarding the last 5-10 cells to which the UE has been connected to.

For each of the N cells included in the intra-RAT information of a UE history, the intra-RAT information for the cell in the UE history may include a variety of information including the following: The UE history may include a cell id of the cell in order to identify the cell. The UE history may include an amount of time the UE stayed connected to the cell. The UE history may include HO parameters used when the UE was connected to the cell including, for example, the hysteresis value used, the offset value used and/or the TTT value used. The UE history may also include HO event time stamps. For example, the HO event time stamp may indicate a point in time when an HO event resulting in the UE being handed over to a new cell was initiated. Further, the UE history may include an entry corresponding to each connection request sent from the UE. Consequently, if the UE sends a series of consecutive connection requests for the same cell, a series of consecutive entries for the same cell may appear in the UE history.

As will be discussed in greater detail below, according to at least one example embodiment, for each of the N cells, the entry in the intra-RAT information of the UE history corresponding to the cell is added to the UE history by the eNB of the cell.

With respect to the IRAT information included in the UE history for each UE, the IRAT information may include information regarding IRAT HO events that included any of the last N cells to which the UE has been connected. For example, in accordance with known methods, during IRAT HO events, the MME 130 may receive S1 release or S1 HO messages indicating that i) a UE wishes complete a HO operation by switching to, for example, one of the first and second eNBs 110A and 110B from a cell of another RAT type; or ii) a UE wishes complete a HO operation by switching from, for example, one of the first and second eNBs 110A and 110B to a cell of another RAT type. Using the S1 release and/or S1 HO messages received at the MME 130 in connection with the IRAT HO events involving a particular UE, the MME 130 can make an entry, in the IRAT information of the UE history for that UE, for each cell that is either the origin (i.e., the cell being switched from) of an IRAT HO operation or the target (i.e., the cell being switched to) of an IRAT HO operation. Further, for each entry in the IRAT information of the UE history, the MME 130 can include an IRAT HO event time stamp indicating a point in time with the S1 release or HO message indicating the IRAT HO event was received. In step S220, the first eNB 110A may determine an activity type of the first UE 122 based on the UE history of the first UE 122.

For example, using the information included in the UE history of the first UE 122, the first eNB 110A may determine attributes of the first UE 122 including a location of the first UE 122 within a cell and a mobility of the first UE 122. The location and mobility of a UE, together, may be characterized as an activity type of the UE. At each eNB, each UE may be determined by the eNB to have an intra-RAT activity type and an IRAT activity type.

For example, using the UE history of first UE 122, the first eNB 110A may classify the intra-RAT activity type of the first UE 122 as a high speed UE (UE-HS), a low speed UE near the border of a cell (UE-LSBC), a low speed UE near a center of a cell (UE-LSCC), or none of the UE-HS, UE-LSBC, and UE-LSCC types.

For example, the UE-HS activity type may indicate a medium/high speed (e.g., train or car speed) mobility UE which generates HOs across multiple cells or eNBs including, for example, inter-frequency, and intra RAT events. Accordingly, the first eNB 110A may determine an intra-RAT activity type of the first UE 112 as UE-HS if the UE history of the first UE 122 includes several different cell entries on which the UE was last active. According to at least one example embodiment, the different cell entries may be from different eNBs. For example, if the UE history of the first UE 122 indicates the number of different cells the first UE 122 has been connected to over a reference amount of time T1, for example 15 minutes, exceeds a reference number of cells, for example 4 cells, the first eNB 110A may determine the intra-RAT activity type of the first UE 122 is UE-HS. The reference time T1 and number of cells may be set in accordance with a preference of an operator of the communications network 100.

The UE-LSBCs activity type may indicate UEs located near the border of a cell with low speed mobility (e.g., pedestrian speed or slower). UE-LSBC type UEs may trigger HO events between a small number of cells, for example, two cells. Accordingly, the first eNB 110A may determine the intra-RAT activity type of the first UE 112 to be UE-LSBC if the UE history of the first UE 122 indicates the first UE 122 has spent a relatively long period of time connected to the same small group of cells (i.e., time and number of cells below chosen thresholds). For example, if the UE history of the first UE 122 indicates the number of cells the first UE 122 has been connected to over the reference amount of time T2, for example 15 minutes, exceeds 1 but does not exceed the reference number of cells, for example the same 2-3 cells, the first eNB 110A may determine the intra-RAT activity type of the first UE 122 to be UE-LSBC.

The UE-LSCCs activity type indicates UEs with minimal mobility which do not trigger any mobility events for a "long period" of time (e.g., more than 15 min, an hour), and will be served by the same cell. Accordingly, the first eNB 110A may determine the intra-RAT activity type of the first UE 112 to be UE-LSCC if the UE history of the first UE 122 indicates the first UE 122 has spent a long period of time connected to the same cell, or cells of different frequencies of the same eNB. For example, if the UE history of the first UE 122 indicates the number of different cells, excluding cells of different frequencies associated with the same eNB, that the first UE 122 has been connected to over a reference amount of time T3, for example 15 minutes, does not exceed 1 cell, the first eNB 110A may determine the intra-RAT activity type of the first UE 122 to be UE-LSCC.

The threshold values T1-T3 for the reference amounts of time are set in accordance with the preferences of an operation of the network 100, and may be the same or different with respect to one another. Similarly, the reference number of cells for the detection of the UE-HS, UE-LSBC and US-LSCC types are set in accordance with the preferences of an operator of the network 100, and may be the same or different with respect to one another.

Further, using the UE history of first UE 122, the first eNB 110A may classify the IRAT activity type of the first UE 122 as being a low speed UE near an IRAT border of a cell (UE-LSBCI). The UE-LSBCI activity type may indicate UEs located near an IRAT border of a cell with low speed mobility (e.g., pedestrian speed or slower). UE-LSBCI type UEs may trigger a relatively high number of IRAT HO events involving, for example, a relatively small number of cells, for example one or two. Accordingly, the first eNB 110A may determine the IRAT activity type of the first UE 112 to be UE-LSBCI if the IRAT information in the UE history of the first UE 122 indicates the first UE 122 has generated more than a reference amount of IRAT HO events over a reference amount of time T4, for example, 5 minutes. For example, if the UE history of the first UE 122 indicates the number IRAT HO events experienced by the first UE 122 over the last 15 minutes, exceeds a reference number of IRAT HO events, for example 5 IRAT HO events, the first eNB 110A may determine the IRAT activity type of the first UE 122 to be UE-LSBCI. Otherwise, the first eNB 110A may not classify the first UE 122 as having a IRAT activity type, thus triggering the use of default IRAT HO parameters as will be discussed in greater detail below with reference to step S230.

The reference value amount of time T4 and the reference number of IRAT HO events may each be set in accordance with the preference of an operator of the communications network 100. Further, UEs having a UE history with intra-RAT information entries corresponding to an amount of time below a threshold value T5, for example 5 minutes, may be classified as having any of the intra-RAT activity types UE-HS, UE-LSBC, and UE-LSCC, thus triggering the use of default inter-RAT HO parameters as will be discussed in greater detail below with reference to step S230. Likewise, UEs having a UE history with IRAT information entries corresponding to an amount of time below the threshold value T5, for example 5 minutes, may be classified as having any of the intra-RAT activity types, thus triggering the use of default IRAT HO parameters as will be discussed in greater detail below with reference to step S230. The threshold value T5 may be set in accordance with the preference of a network operator. Thus, according to at least one example embodiment, the activity type of a UE may be determined to correspond to one of the UE-HS, UE-LSCC and UE-LSBC types discussed above based on the activity data in the corresponding UE history only after enough time has passed for the UE history to include meaningful activity data.

In step S230, the first eNB 110A may set the HO parameters to be used for the first UE 122 based on the activity type of the first UE 122 determined in step S220.

For example, each eNB in the communications network 100 may have values for each of its HO parameters corresponding to an activity type of the UE corresponding to the HO parameters. For example, for each eNB in the communications network 100, the HO parameters in the eNB may include intra-RAT HO parameters used for intra-RAT HO operations between cells of the same RAT types, for example a first cell having an LTE RAT and a second cell having an LTE RAT. Additionally, the HO parameters may include IRAT HO parameters used for IRAT HO operations between cells of different RAT types, for example a first cell having an LTE RAT and a second cell having a universal mobile telecommunications system (UMTS), CDMA2000, or WiMAX RAT.

The values for the intra-RAT and IRAT HO parameters may be different for each of the eNBs and may be chosen in accordance with the preferences of an operator of the communications network 100. In addition, a different set of parameters may be used depending on the type of service in use by the UE. For example, there may be a set of parameters for best effort services such as internet access, another set for real-time services such as voice over IP (VoIP) calls, and eventually other sets for other types of services. For example, each eNB may have a set of HO parameters corresponding to each the UE activity types (which may include different sets based on service types, as mentioned before for example one set for best effort and another for real time services like Voice). For example, each eNB may have an intra-RAT HO parameter set for US-HS activity type UEs, another intra-RAT HO parameter set for UE-LSCC activity type UEs, another intra-RAT HO parameter set for UE-LSBC activity type UEs, and a default intra-RAT HO parameter set. Further, each eNB may have an IRAT HO parameter set for US-LSBCI activity type UEs, and a default IRAT HO parameter set. For each eNB, the values in each of the intra-RAT and IRAT HO parameter sets may be set in accordance with the preference of an operator of the communications network 100. The default intra-RAT HO parameter set corresponds to UEs which are determined, in step S220, not to fall into any of the intra-RAT UE activity types UE-HS, UE, LSCC or UE-LSBC. The default IRAT HO parameter set corresponds to UEs which are determined, in step S220, not to fall into the IRAT UE activity type UE-LSBCI.

Referring to FIG. 2, after step S230 is completed, in step S240 the eNB 110A may update the UE history received in step S210 based on the behavior of the first UE exhibited while connected to the first eNB 110A. For example, when the first UE 122 indicates to the first eNB 110A that the first UE 122 is participating in an HO event which will result in the first UE 122 being handed over to a cell of a different eNB, the first eNB 110A may add an entry to the intra-RAT information in the UE history of the first UE 122 including the cell information discussed above with respect to step S210. Likewise, if the first eNB 110A provides wireless coverage for more than one cell, each time the first UE 122 changes between cells within the coverage of the first eNB 110A, the first eNB 110A may add an entry to the UE history of the first UE 122 including the cell information discussed above with respect to step S210.

In step S250, the first eNB 110A may send the updated UE history to the MME 130. For example, when the first UE 122 indicates to the first eNB 110A that the first UE 122 is participating in an intra-RAT HO event which will result in the first UE 122 being handed over to a cell of a different eNB, the first eNB 110A may send the updated UE history to the MME 130 as part of the HO process. For example, the first eNB 110A may send the UE history to the MME 130 in a UE context release complete message to the MME 130. For example, the UE context release complete message used by the first eNB 110A may be that which is defined in the 3GPP specification TS 23.401. Additionally, in step S250, if the first UE 122 is participating in a IRAT HO event, the MME 130 will receive an S1 release or S1 HO message which the MME 130 can use to update the IRAT information in the UE history of the first UE 122 in the manner discussed above with reference to step S210.

Thus, according to at least one example embodiment, eNBs in the communications network 100 can use UE histories detailing behavior of each UE over multiple cells and multiple eNBs to make intelligent decisions about how best to tune HO parameters in order to provide a balance between the dual interests of providing UEs with a desirable quality of user experience and lessening a strain on network resources by lessening an amount of HO events.

FIG. 3 is a flow chart illustrating a process for providing UE history information in order to facilitate updating of HO parameters according to at least one example embodiment. FIG. 3 will be described with reference to the communications network 100 of FIG. 1A from the perspective of the MME 130. However, the operations described below with respect to the MME 130 may be performed by any MME in the communications network 100.

In step S315, the MME 130 may receive a service request from the first eNB 110A. For example, once the first UE 122 enters a coverage area of the first eNB 110A, the first UE 122 may send a request to connect to the first eNB 110A. The request to connect may be, for example a Non Access Stratum: service request as defined by 3GPP specification TS 23.401. The request may be received at the first eNB 110A and forwarded by the first eNB 110A to the MME 130 in accordance with known procedures.

In step S320, the MME 130 may send the UE history of the first UE 122 to the first eNB 110A. For example, in response to the request received at the MME 130 from the first eNB 110A in step S320, the MME 130 may send a UE history of the first UE 122 to the eNB 110A. For example, the MME 130 may send the UE history to the eNB 110A in an initial context setup request message to the eNB 110A. For example, the initial context setup request message received by the eNB 110A may be that which is defined in the 3GPP specification TS 23.401. The contents of the UE history may be the same as those discussed above with reference to FIG. 2. A plurality of UE histories corresponding to the UEs connected to the communications network 100 may be stored at the MME 130, for example, in the memory unit 156 of the MME 130. After receiving the connection request in step S315, the MME 130 may identify the UE history corresponding to the UE indicated in the connection request.

In step S330, the MME 130 receive an updated version of the UE history of the first UE 122 from the first eNB 110A.

For example, while the first UE 122 is connected to a cell for which the first eNB 110A is providing wireless coverage, the first eNB 110A may store information regarding the behavior of the first UE 122 in the UE history for the first UE 122, as is described above with reference to step S240 in FIG. 2. Further, when the first UE 122 indicates to the first eNB 110A that the first UE 122 is participating in an HO event which will result in the first UE 122 being handed over to a cell of a different eNB, the MME 130 may receive the updated UE history from the first eNB 110A as part of the HO process, as is described above with respect to step S250. For example, the MME 130 may receive the UE history from the first eNB 110A in a UE context release complete message to the MME 130. For example, the UE context release complete message received by the first MME 130 may be that which is defined in the 3GPP specification TS 23.401.

Accordingly, the MME 130 acts as a central location at which to store the UE history of one or more or all UEs in the communications network 100. Because the UE histories are stored at the MME after being updated at each eNB, the UE histories stored at the MME may reflect information collected from multiple cells across multiple eNBs, thus providing each eNB which receives the UE histories from the MME 130 with more detailed information upon which to base HO parameter updating decisions.

Example embodiments being thus described, it will be obvious that the same may be varied in many ways. Such variations are not to be regarded as a departure from example embodiments, and all such modifications are intended to be included within the scope of example embodiments.

What is claimed:

1. A method of setting hand over (HO) parameters for a user equipment (UE) connected to a first cell of a base station (BS), the method comprising:
   receiving, at the BS, history data corresponding to the UE, the history data including, for one or more cells the UE was previously connected to, at least one entry including HO information of the UE at a respective one of the one or more cells;
   determining at the BS, an activity type of the UE, from among a plurality of activity types, based on the history data, the plurality of activity types including one or more high speed activity types and one or more low speed activity types, the history data indicating a total number of different cells visited by the UE in a reference amount of time, the determining including determining the activity type of the UE to be one of the one or more high speed activity types or one of the one or more low speed activity types based on the indicated total number of different cells visited by the UE in a reference amount of time; and setting, at the BS, the HO parameters for the UE based on the determined activity type, the HO parameters controlling the manner in which the UE detects conditions for initiating an HO event, wherein when the activity type of the UE is determined to be one of the one or more low speed activity types, the determining an activity type of the UE further includes, when the indicated total number of different cells visited by the UE in the reference amount of time is below a reference value, determining a location of the UE to be near a center of a cell, and when the indicated total number of different cells visited by the UE in the reference amount of time is at or above a reference value, determining a location of the UE to be near a border of a cell, and the setting the HO parameters further includes setting the HO parameters based on the determined location of the UE.

2. The method of claim 1, wherein the HO parameters include at least one of a hysteresis value, an offset value and a time to trigger (TIT) value.

3. The method of claim 1, wherein the BS is an enhanced node B (eNB), and the method further comprises:

determining, at the eNB, to perform an HO operation for switching the UE from being connected to the first cell of the BS to a second cell;

updating, at the eNB, the history data of the UE by including information regarding the HO operation in the history data; and sending the history data from the eNB to a mobility management entity (MME) associated with the eNB.

4. The method of claim 1, wherein the HO parameters set at the BS include inter-radio access technology (RAT) HO parameters controlling the manner in which the UE detects conditions for initiating an inter-RAT HO event between cells having different RAT types, and intra-RAT HO parameters controlling the manner in which the UE detects conditions for initiating an intra-RAT HO event between cells having a same RAT type.

5. The method of claim 1, wherein the setting, at the BS, the HO parameters for the UE includes setting the HO parameters based on the activity type and an active service type of the UE, the active service type being one of guaranteed bit rate and best effort.

6. A base station (BS), the base station comprising:

a processor configured to execute operations for setting hand over (HO) parameters for a user equipment (UE) connected to a first cell of the BS, the operations including, receiving, at the BS, history data corresponding to the UE, the history data including, for one or more cells the UE was previously connected to, an entry including HO information of the UE related to a respective one of the one or more cells;

determining at the BS, an activity type of the UE, from among a plurality of activity types, based on the history data, the plurality of activity types including one or more high speed activity types and one or more low speed activity types, the history data indicating a total number of different cells visited by the UE in a reference amount of time, the determining including determining the activity type of the UE to be one of the one or more high speed activity types or one of the one or more low speed activity types based on the indicated total number of different cells visited by the UE in a reference amount of time; and setting, at the BS, the HO parameters for the UE based on the determined activity type, the HO parameters controlling the manner in which the UE detects conditions for initiating an HO event, wherein when the activity type of the UE is determined to be one of the one or more low speed activity types, the determining an activity type of the UE further includes, when the indicated total number of different cells visited by the UE in the reference amount of time is below a reference value, determining a location of the UE to be near a center of a cell, and when the indicated total number of different cells visited by the UE in the reference amount of time is at or above a reference value, determining a location of the UE to be near a border of a cell, and the setting the HO parameters further includes setting the HO parameters based on the determined location of the UE.

7. The BS of claim 6, wherein the HO parameters include at least one of a hysteresis value, an offset value and a time to trigger (ITT) value.

8. The BS of claim 6, wherein the BS is an enhanced node B (eNB), and the processor is configured such that operations further include, determining, at the eNB, to perform an HO operation for switching the UE from being connected to the first cell of the BS to a second cell;

updating, at the eNB, the history data of the UE by including information regarding the HO operation in the history data; and sending the history data from the eNB to a mobility management entity (MME) associated with the eNB.

9. The BS of claim 6, wherein the processor is configured such that the HO parameters set at the BS include inter-radio access technology (RAT) HO parameters controlling the manner in which the UE detects conditions for initiating an inter-RAT HO event between cells having different RAT types, and intra-RAT HO parameters controlling the manner in which the UE detects conditions for initiating an intra-RAT HO event between cells having a same RAT type.

10. The BS of claim 6, wherein the processor is configured such that, the setting, at the BS, the HO parameters for the UE includes setting the HO parameters based on the activity type and an active service type of the UE, the active service type being one of guaranteed bit rate and best effort.

* * * * *